United States Patent [19]
Grissom et al.

[11] 3,866,075
[45] Feb. 11, 1975

[54] VACUUM TYPE TRIGGER DISCHARGE TUBE WITH CUP SHAPED ANODE

[75] Inventors: John T. Grissom; Leslie A. Shope, both of Albuquerque, N. Mex.

[73] Assignee: The United States of America as represented by the United States Atomic Energy Commission, Washington, D.C.

[22] Filed: May 9, 1974

[21] Appl. No.: 468,316

[52] U.S. Cl.............. 313/178, 313/198, 313/214, 313/220, 313/318
[51] Int. Cl. ............................................. H01j 19/68
[58] Field of Search .......... 313/178, 174, 187, 197, 313/198, 214, 216, 220, 218, 217, 318, 330

[56] References Cited
UNITED STATES PATENTS
3,087,092  4/1963  Lafferty ........................ 313/187 X
3,509,406  4/1970  Rich.............................. 313/198 X
3,719,852  3/1973  Goody ................................ 313/178

Primary Examiner—Palmer C. Demeo
Attorney, Agent, or Firm—John A. Horan; Dudley W. King; Richard E. Constant

[57] ABSTRACT

A long-life discharge tube, which may be miniaturized and still hold-off high voltages and which may be operated in conditions which may include high pressure gas atmospheres and high temperatures surrounding the tube, including gas impervious ceramic and metal wall components over all exterior portions of the tube and a generally cup-shape anode electrode separted from an annular triggered cathode which is positioned at least partially within the walls of the anode.

12 Claims, 4 Drawing Figures

PATENTED FEB 11 1975

3,866,075

VACUUM TYPE TRIGGER DISCHARGE TUBE WITH CUP SHAPED ANODE

BACKGROUND OF INVENTION

This invention relates to an electrical discharge tube, and particularly a vacuum-type discharge tube, which has long operating life characteristics under environmental conditions which would normally adversely affect the tube operating characteristics in a relatively short period of time.

It is desirable in some applications to provide discharge or swtiching tubes which are capable of surviving for very long periods of time, such as up to 15 years or longer, in a gaseous environment which may include hydrogen and/or helium at elevated pressures and temperatures. Prior discharge tubes in these environments, whether vacuum or gas tubes, would permit sufficient gas atoms of these gases to permeate the tube materials into the tube interior. The accumulation of the gas in the interior, regardless of the use of special gettering materials and the like, would eventually increase the gas pressure within the tube envelope to a degree where either the tube hold-off strengths, the tube switching times or other tube operating characteristics would be adversely affected. Prior discharge tubes thus had a very limited life, generally less than a few years in gaseous atmospheres of for example one atmosphere at temperatures of up to 350K.

The gas permeation into the interior of discharge tubes is particularly critical in applications where the discharge tube may be subjected to radiation. The accumulation of excess gas atoms in the discharge region of a discharge tube which is being irradiated may cause premature firing or operation of the discharge tube in an undesirable manner. Thus, even small quantities of gas permeating into the interior of a discharge device can have a substantial effect on the operation thereof.

Because of the current trend to provide smaller and smaller components in systems and apparatus, it is desirable that such a discharge tube also be capable of miniaturization without compromising other operating characteristics. In addition, the miniaturized tube should be of a rugged design which is capable of surviving large mechanical loads and vibrations to which many apparatus or systems may be subjected.

SUMMARY OF INVENTION

In view of the above, it is an object of this invention to provide a novel, triggered, long-life discharge tube or switching tube.

It is a further object of this invention to provide such a discharge tube which is capable of operating in a gaseous environment at elevated pressures and temperatures.

It is a further object of this invention to provide such a discharge tube which may be of small size with high hold-off voltage operating capabilities.

It is a further object of this invention to provide a miniaturized discharge tube which has long-life and high hold-off voltage characteristics and which is of highly rugged and simple design.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention, may be made by those skilled in the art.

The invention relates to a triggered, long-life discharge tube having gas impervious ceramic and metal outer portions over the entire surface of the tube envelope, a cup-shape anode member disposed in the envelope with the rim of the anode encircling and partially overlapping an annular triggered cathode.

DESCRIPTION OF DRAWING

The invention is illustrated in the accompanying drawing wherein.

DETAILED DESCRIPTION

Figure 1:
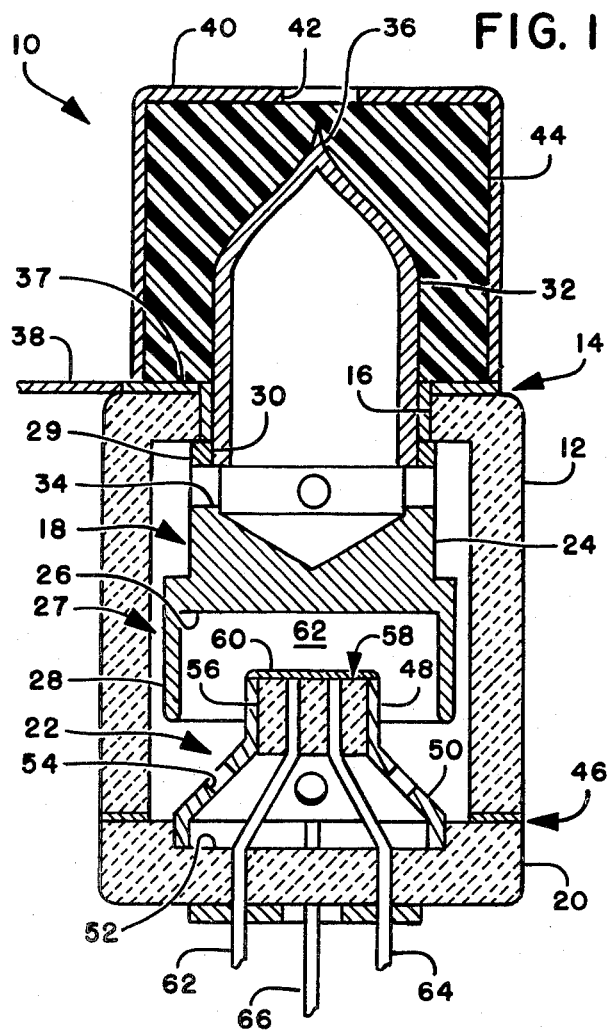
FIG. 1 is an elevation side view in cross section of a discharge tube incorporating many of the features of this invention.

The triggered, long-life switching or discharge tube of this invention, as shown in FIG. 1, may include an envelope formed from a generally hollow cylindrical or tubular ceramic body 12 which is open at both ends for ready assembly. One of the open ends may have a folded over or partially restricted portion 14 leaving a passageway 16 for support and access to a suitable anode assembly 18. The remaining open end of body 12 may be covered or closed by a ceramic header or wall 20 which also acts as a support for the cathode assembly 22.

The anode assembly 18 may be assembled within the envelope body 12 before attaching the wall 20 to the body. The anode assembly may include a cup-shaped anode member 24 having a planar discharge surface 26 facing the cathode assembly 22 with an annular rim portion or wall 28 extending from the periphery of planar portion 26 toward the cathode assembly 22. The planar portion 26 and the inner wall of the rim portion 28 act as the discharge surface of the anode assembly 18. The rim portion 28, as shown, is spaced from the interior walls of body 12 leaving a gap 27, typically about 0.35 millimeters (mm) wide, to provide a long insulative path from the anode assembly 18 to the cathode assembly 22. The anode member 24 may be provided with a shoulder 29 for rigid mounting against portion 14 and a central bore or passageway 30 to which a tubular, gas impervious member or tubing 32 is attached. The interior of tubing 32 communicates with the interior of the envelope of tube 10 via one or more holes 34 through the side walls of bore 30 and anode member 24. After the desired atmosphere is provided inside the envelope of the completely assembled tube 10 through tubing 32, tubing 32 may be closed off, such as by pinching or the like, as indicated at end portion 36 thereof. The entire anode assembly may be inserted into body 12 from the open end adjacent to wall 20 before wall 20 is attached thereto and the tubing 32 and shoulder 29 brazed or otherwise attached to portion 14 and passageway 16 in body 12. As will be described more fully below, this attachment is made in a manner so as to be nearly gas impervious. Thereafter, an open centered connecting element or eyelet 37 may be brazed directly to tubing 32. Eyelet 37 may include a tab or projection 38 to which an electrical connection may be made to the circuitry which utilizes discharge tube 10. A suitable cap 40 having an opening 42 may be attached to portion 14 of body 12 over tubing 32 and its closed portion 36 and eyelet 37. Cap 40 may then be filled with a suitable encapsulant 44 through opening 42. Cap 40 and encapsulant 44 may aid in suppressing corona discharges from end portion 36 and protect the same from physical damage.

After the mounting of the anode assembly 18 into the body 12 of tube 10, the cathode assembly 22 and wall 20 may be attached and sealed to the remaining open end of body 12 around junction 46. The junction 46 may be formed in the same or similar manner as the joint between tubing 32 and passageway 16. The cathode assembly 22 may include an annular or tubular shaped cathode 48 which may form a part of or be attached to a truncated conical portion or member 50 which is fastened to the end wall 20 in a recessed portion 52. The conical portion 50 may be provided with suitable passageways or openings 54 through which control of the atmosphere within the envelope may be achieved when the tube 10 interior is evacuated and baked out, and if desired backfilled with a suitable gas, through tubing 32. A ceramic or other suitable symmetrical insulator cylinder or body 56 may be positioned within the interior or central portion of the annular cathode 48 with its end or planar surface 58 facing planar portion 26 of anode assembly 18 and generally flush with or contiguous with the terminating portion or edge of cathode 48. The entire surface 58 or portions thereof may be coated with a trigger film or layer 60 which makes contact initially with at least a portion of the cathode 48. One or more trigger electrodes, such as electrodes 62 and 64, may be symmetrically positioned within suitable bores or passageways in insulator 56 so as to penetrate the cylinder 56 to surface 58 and into electrical contact with film 60. The trigger electrodes 62 and 64 may be passed through and sealed to end wall 20 in an appropriate manner. An additional lead or terminal 66 may also be passed and sealed through end wall 20 into electrical contact with cathode 48 through conical portion 50, as shown.

The terminating portion of cathode 48 and surface 58 of insulator 56, as well as trigger film 60, are positioned partially within and overlapping rim portion 28 of anode member 24 with these elements generally parallel to the planar portion 26 thereof. Generally, the spacing or discharge gap 67 between cathode 48 and rim portion 28 is the same as or comparable to the spacing of cathode 48 and planar portion 26. This spacing and the hollowed out shape of the anode member 24 provides an electric field strength around the terminating edge of cathode 48 which is substantially higher than for a gap formed between planar electrodes to minimize damage to the trigger electrodes and film, lower the resistance of the tube and extend life of the cathode. The end of rim 28 is preferably of arcuate shape, and generally of a full radius, to minimize arc concentrations at its edges. In addition, the cathode 48 is provided with a slight radius (about 0.05 mm) around its terminating edge for the same reason. The generally cup-shaped anode member 24 protects the walls of the body 12 from any eroded material which may result from discharges created in tube 10 so as to minimize the possibility for shorting between the cathode assembly 22 and anode assembly 18 in addition to providing the higher electric field strengths and electrically shielding the discharge region.

The large diameter of the base portion 50 of the cathode assembly 22 provides a high strength mechanical connection to the base 20 as well as a generally coaxial and consequently low inductance coupling of electrical energy to the cathode 48. The anode assembly 18, likewise, utilizes a relatively large diameter mechanical coupling to the body 12 to provide this high strength connection and also incorporates a coaxial-type of electrical connection through eyelet 37 to the anode assembly 18.

Since it is intended that the discharge tube 10 be operated with a gas atmosphere around the exterior of the tube under pressures of about one atmosphere at elevated temperatures, the various materials and operating characteristics of the tube must be selected, it has been found, to minimize or prevent buildup of gas pressure within the tube interior for extended periods of time. Since helium permeates insulators at as high or higher rate than any other gas and as hydrogen does the same for metals compared to other gases, these gases will be referred to as the worst possible case in the following examples and description. The various materials and operating techniques are selected to block or impede these gases from the interior of tube 10 and thus will block or impede all gases in a similar manner to an even greater degree.

It will also be apparent that in a gas-type of discharge tube, that these same considerations prevent the escape of gas and the reduction of gas pressure below some desired level. This arrangement may be utilized in either vacuum or gas-type discharge tubes though the vacuum-type may be preferred in radiation environments.

The ceramic envelope materials, that is body 12 and wall 20, may be made of alumina ($Al_2O_3$) formed in a manner to prevent voids therein which may be interconnected to form a path for gas passage therethrough. This may be achieved by grinding the alumina into particles and then sintering the same under pressure to achieve densities of greater than about 94 percent of theoretical density.

The metal or electrically conductive portions of the tube 10 which form part of the envelope or have portions common to both the interior and the exterior of the envelope are made of a gas, and particularly hydrogen, impermeable metal which has sufficient strength at the operating temperatures to which the tube may be subjected. Gold in its pure form exhibits one of the lowest gas permeation rates of all metals and thus is the preferred metal to be used for tubing 32 and the bonding material for the various joints. The metals tin, lead and aluminum exhibit desired low hydrogen gas permeation rates but may not have sufficient strength or may not be suitable for vacuum tube processing, due to their relatively low melting temperatures. Molybdenum and copper may have sufficient structural strength but permeate hydrogen at a somewhat higher rate. These latter materials may be used for the electrodes 62, 64, and 66, as long as their length to diameter ratio is about 2.5 to 1 through the portion of the electrode which is passing through wall 20 to minimize gas permeation therethrough.

The structural joints between wall 20 and body 12 may be formed by plating the joining portions thereof on each member with a layer of gold and then a gold washer placed therebetween which may then be diffusion bonded together to form a gas impermeable joint. Each of the joints or connections between an envelope member and one of the metal members passing therethrough, such as between tubing 32 and body 12, between eyelet 37 and body 12 and between the electrodes 62, 64, and 66 and wall 20 are preferably covered with a sintered thin metalization layer of such as a slurry of molybdenum, manganese, titanium hydride and binders which is then plated with gold and brazed with a higher gold content braze (such as about 80 percent or more gold) to insure a gas impervious connection. With these particular materials utilized as envelope and bonding materials it has been found that the discharge tube 10 interior gas pressure may be kept below $10^{-45}$ $^3$ torr for greater than 15 years within a gas atmosphere at a temperature of about 350K and a pressure of one atmosphere about the exterior of the discharge tube.

The materials within the tube, that is the anode member 24, the cathode 48 and cathode support 50 may be formed of materials which have a relatively high melting point, relatively high structural strength at the higher operating temperatures of the tube, and desirably an at least limited gettering ability for gases. For example, these members may be formed of refractory metals, various alloys or the like including such as molybdenum and certain ironnickel alloys. If a gas should leak into the interior of tube 10, these materials may getter the gas and maintain the operation of the discharge tube.

By way of comparison, assuming an internal tube volume of about 0.3 cubic centimeters in which a maximum internal pressure of $10^{-2}$ torr may be tolerated at the end of 15 years and assuming no internal surface gettering and an external hydrogen gas pressure about the tube at 350K of one atmosphere, a gold wall material could have an area to thickness ratio of greater than $10^4$ compared to molybdenum, greater than $10^6$ compared to copper, greater than $10^8$ compared to certain iron-nickel alloys, and greater than $10^9$ compared to nickel for the same gas permeation rates. Assuming a cylindrical leakage path, the length to diameter ratios of these materials may be about $3.5 \times 10^{-6}$, $1.13 \times 10^{-1}$, $2.16 \times 10$, $1.81 \times 10^3$ and $2.19 \times 10^4$, respectively for the same premeation rates. As a further comparison, the helium break-through time through an aluminum oxide wall is greater than 100 years while for many typical sealing glasses it is in the time span of less than two months.

The trigger film 60 may be vacuum evaporated over the surface 58 of insulator 56 and is preferably a meterial that has high adherence, is stable under the operating conditions of the discharge tube and is capable of gettering gas to some degree. A particularly useful material having these characteristics is titanium. Other materials may include erbium and scandium. It has been found that it is preferred that the trigger film be essentially gas free at the beginning of tube life to insure the maximum gettering ability of the film. By vacuum evaporating the film onto surface 58, the film may be put down in virtually any shape or thickness with high quality control of the film geometry and its purity. It has been found that thicker films will provide longer lifetimes or increased number of tube firings but may require a higher energy triggering pulse in the first few operations of the tube to cause it to operate. A typical titanium trigger film 60 may be deposited with an area density of about 2 milligram/square centimeter, which may exhibit an initial resistance of about 0.5 ohm between trigger electrode and cathode. After a triggering film has been utilized in an actual tube firing, the arcing which occurs between the trigger electrodes 62 or 64 and cathode 48 will cause some errosion of the film and effect a greater resistance across the film and will be more readily triggered with consistent results on subsequent firing of the discharge tube. For example, after three or four trigger pulses of about 150 amps for 5 microseconds each, the resistance may increase to greater than about 1 Kohm and stay at or above this level for many more tube operations.

In a typical switching or discharge tube 10 as illustrated in FIG. 1, the tube may be formed with an outer diameter of about 1 centimeter and a length of about 1.75 centimeters and provide a reliable hold-off voltage of about 10 kilovolts in a vacuum-type tube having an internal pressure of less than about 1 millitorr. In such a tube, the cathode to anode spacing between the cathode and the planar portion and the rim portion of the anode member may be about 1.3 millimeters while the space between the interior walls of body 12 and the anode member is about 0.35 millimeters. Such a tube may hold off as much as 20 kilovolts for 90 seconds. By way of example, when a trigger pulse of about 400 volts having a rise time of about 100 nanoseconds is applied, a tube may begin its main discharge in an average of about 20 nanoseconds after trigger strike. The triggering voltage may reach levels of from about 50 to 300 volts before trigger strike occurs. Such a tube may be fired reliably for over 1,500 operations at 200 amps peak. The discharge tube 10 may be used to reliably provide voltage hold-offs of up to about 3,500 volts, peak switching currents of from about 200 to 1,000 amps, and a shelf life of 15 years in one atmosphere of gas at 350K. The tube may be capable of surviving shock environments of 15,000 g and linear accelerations of 12,000 g.

Figure 2:
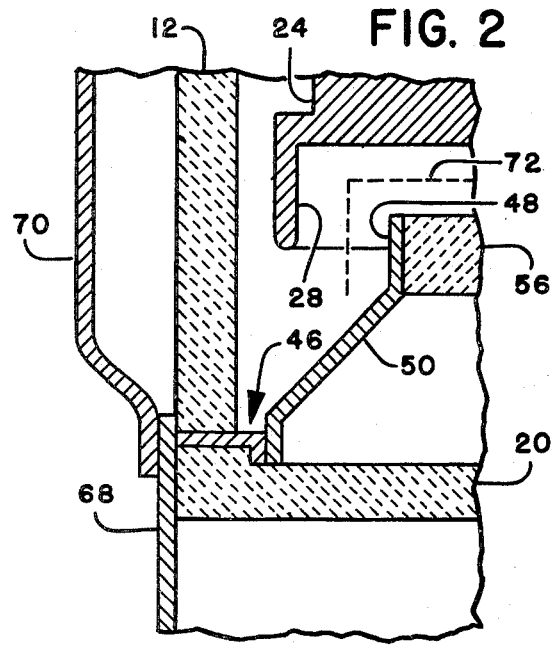
FIG. 2 is a cross-sectional view of a portion of the discharge tube shown in FIG. 1 having certain modifications or additions thereto.

In order to increase the current carrying capabilities of the discharge tube and to further reduce the inductance of the cathode circuit, the junction 46 between body 12 and end wall 20 may be extended to contact with cathode support 50 and a tubular skirt or connector 68 fitted around the periphery of body 12 and wall 20, as shown at FIG. 2. Since the cathode 48 is at ground potential in many applications, a shielding of the tube may be provided by positioning a tubular shielding member 70 in contact with tubular connector 68 around the periphery of body 12 and extending therealong over a substantial portion of the tube length.

If it is desired, a screen grid electrode 72 may be positioned between the anode and cathode and biased negative with respect to the cathode 48. When a negative voltage of sufficient amplitude is applied to the screen grid 72, a vacuum arc may be prevented from occurring between the anode and cathode, even when the trigger arc operates in the normal manner. The bias grid may thus provide an additional means of controlling the operating of the triggered vacuum switch. The bias screen may prevent the switch from operating by limiting the electron current which flows from the trigger plasma to the anode, which is normally required to initiate a vacuum arc discharge between the anode and cathode. Without the screen voltage present, the electrons from the trigger plasma may move to the anode under the influence of the electric field between the electrodes. As a result, the trigger plasma expands across the gap from the cathode to the anode behind a plasma sheath formed by the separation of the plasma electrons from the ions at the leading edge of the expansion. Prior to the formation of a vacuum arc between the anode and cathode, the flow of electrons from the trigger plasma to the anode is presumably space-charge limited. Under this condition, the expansion of the trigger plasma across the electrode gap may increase the maximum electron current which can flow to the anode. For field strengths in the electrode gap that are representative of vacuum switch tubes, the expansion of the plasma from the cathode to the anode may even be required in order to be able to draw enough electron current from the plasma to the anode to cause the formation of a vacuum arc in a gap. The bias grid may limit the electron current to the anode by interfering with the motion of the plasma electrons across the electrode gap. As the magnitude of the negative screen voltage is increased, the number of plasma electrons which are energetically capable of passing through the screen and reaching the anode decreases. As a result, the density of the plasma between the screen and the anode also decreases. The negative bias on the screen grid causes the formation of a sheath in the plasma adjacent to the screen. When the magnitude of the screen bias becomes large enough to make the sheath thickness much greater than the dimensions of the openings in the screen, the plasma may not penetrate the screen and no plasma expands to the anode. At this point, the electron current to the anode from the plasma also vanishes, and the main switch discharge may not occur. Provisions also have to be made to provide a feedthrough electrode (not shown) to the screen grid 72 or some manner to interconnect the same with a bias applied to one of the other electrodes of the discharge tube.

Figure 3:
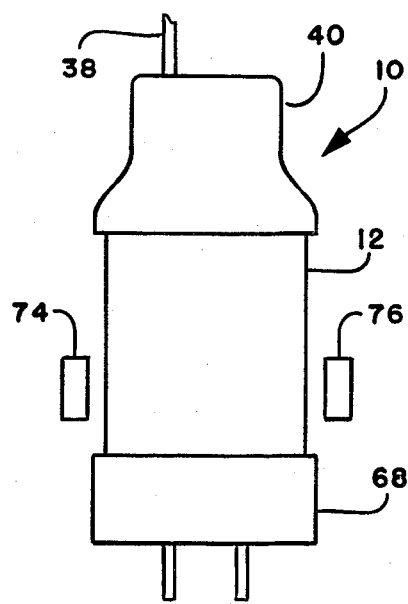
FIG. 3 is a side elevation view of the exterior of the discharge tube shown in FIGS. 1 and 2 illustrating additional features thereto.

Similar control may be achieved by directing a magnetic field transverse to the discharge path between cathode 48 and anode member 24 by such as coils 74 and 76 in FIG. 3 together with an appropriate power supply (not shown). The magnetic field produced by coils 74 and 76 may prevent the triggered vacuum switch from operating by limiting the electron current which flows from the trigger arc plasma to the anode by interfering with the motion of the plasma electrons across the electrode gap. Since the plasma expansion occurs in the direction of motion of the electrons in the leading edge of the expansion, the transverse magnetic field may help to prevent the expansion of the plasma to the anode. Consequently the space-charge limited flow of electrons from the trigger arc plasma to the anode would also be reduced.

FIG. 3 illustrates a modification of cap 40 which provides additional rigidity by overlapping cap 40 about the periphery of envelope 12 and bonding it thereto. The tab 38 may then be bent so as to pass through a hole in cap 40 at its end, if desired, such as through hole 42 in FIG. 1.

A transverse magnetic field may be utilized either alone or in conjunction with the screen grid 72. The combination of the two may provide an enhanced control of the discharge characteristics of the discharge tube and a tailoring of the discharge pulse. It should be noted, that small permanent magnets may be utilized to produce the transverse field which alone would be insufficient to entirely prevent discharge tube operation with the screen grid operating as the main control element.

Figure 4:
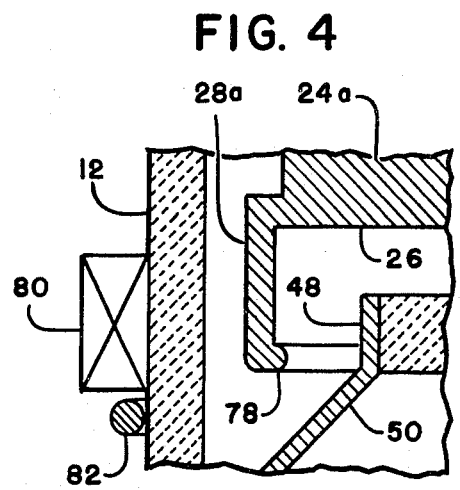
FIG. 4 is a cross-sectional view of a portion of the discharge tube shown in FIG. 1 with additional modifications thereof.

The discharge tubes described with respect to FIGS. 1 and 2 may be modified to provide an ion gauge type of operation or an internal test of the gas pressure within the tube by a modification of the anode member 24 and rim portion 28, as shown by anode member 24a and rim portion 28a in FIG. 4. In this embodiment, the rim portion of 28a of anode member 24a is extended so as to further overlap the cathode 48 and a constricting portion 78 provided at the terminal portion of rim portion 28a. When a magnetic field having lines of force which generally follow the electric field lines between the anode and cathode is produced by a coil 80 and an appropriate power supply (not shown) disposed around body 12 of the discharge tube, electron trapping may be provided in an annular-shaped region near inner wall of rim portion 28a and the portion 78. The portion 78 may take any generally convex arcuate shape or the like. It has also been found that the portion 78 may be eliminated and an annular electrode, such as electrode 82, positioned about the exterior of body 12 generally in a position intermediate the rim portion 28 and the cathode support 50, such as in the position shown or an annular electrode which penetrates the body 12 to the interior of the tube may provide the same operation. These electrodes, such as electrode 82, may also provide an electron trapping in conjunction with the longitudinal magnetic field produced by coil 80.

Existence of trapped electron orbits means that the mean free path of the circulating electron currents may be sufficiently large to insure an ionizing collision between an electron and a residual gas atom or molecule inside envelope 12, even at pressures below $10^{-3}$ torr. These ionizing collisions may lead to a collected ion current at the negative biased electrode or may induce a voltage pulse thereat which is proportional to the gas pressure in the tube.

A gas-filled discharge tube having the configuration shown in FIG. 4 may be initiated by application of the longitudinal magnetic field from coil 80 due to the electron trapping produced when a voltage is applied to the electrodes in the presence of the magnetic field. These trapped electrons constitute a circulating current and eventually undergo ionizing collisions of the gas atoms in the interelectrode region. The motion of the resulting ions may be relatively unaffected by the applied magnetic field and may be accelerated toward the negative biased electrode to initiate an arc discharge between the electrodes, thus triggering the switch tube. The combination of the magnetic field and the triggering electrode in the cathode assembly may provide very accurate control of the discharge tube characteristics. It may also be possible in such a tube to be normally at low gas pressures or a vacuum and have a means for injecting a gas readily into the discharge gap or region 67 of the tube to effect another triggering control thereof.

What is claimed is:

1. A long-life trigger discharge tube comprising a gas impervious, generally tubular ceramic body; a ceramic, gas impervious wall sealed to and closing one end of said body; an anode assembly supported at the other end of said ceramic body, said anode assembly including a cup-shaped anode member disposed within said body having a central circular planar portion surrounded by a tubular rim portion extending into said body and facing towards said first mentioned end, an electrically conductive tubular gas impervious member coupling the interior of said body and said anode member through said ceramic body to the exterior thereof, and means for sealing said tubular member to said other end of said ceramic body and for electrically connecting to said anode member through said tubular member; a cathode assembly supported on said ceramic end wall and including a tubular cathode of smaller diameter than said anode member rim portion extending from said wall and terminating partially within and overlapping said anode rim portion spaced from said anode planar portion by a discharge gap, a ceramic cylinder positioned within said cathode having a planar surface facing said anode planar portion and contiguous with the terminating portion of said cathode, a trigger film disposed on said cylinder surface, at least one trigger electrode penetrating said ceramic cylinder to said surface and into at least partial contact with said trigger film, and means for electrically coupling said cathode and said trigger electrode to the exterior of said ceramic body through said wall.

2. The discharge tube of claim 1 wherein the discharge gap between the tubular cathode and the planar portion and the rim portion of the anode member are of about equal lengths.

3. The discharge tube of claim 1 wherein said cathode assembly includes a conical support means for said tubular cathode which converges from its base to the cathode.

4. The discharge tube of claim 1 wherein said tubular gas impervious member is of gold and said ceramic body and wall are of aluminum oxide ceramic.

5. The discharge tube of claim 4 wherein all junctions of said ceramic body and ceramic wall with each other and with other portions of the tube are sealed with a material selected from the group consisting of gold and gold braze.

6. The discharge tube of claim 5 wherein said trigger film is of titanium and said cathode and said anode member are of molybdenum.

7. The discharge tube of claim 5 wherein said ceramic end wall is joined to the first mentioned end of said ceramic body by plating the joining surfaces of said end wall and said body with a gold layer and thereafter simultaneously diffusion bonding said layers to a gold washer disposed therebetween.

8. The discharge tube of claim 7 wherein said electrical coupling means to said cathode includes an annular collar coupled to said cathode through said diffusion bonded layers.

9. The discharge tube of claim 5 wherein said electrical coupling means to said trigger electrode includes a lead of molybdenum having a length to diameter ratio of about 2.5 to 1 sealed through said ceramic end wall.

10. The discharge tube of claim 1 wherein said anode member includes passageways coupling between said tubular member and interior portions of said tube.

11. The discharge tube of claim 1 wherein said tubular member is sealed at the exterior of said ceramic body and is encased within an encapsulant.

12. The discharge tube of claim 1 including an annular connector having a central opening encircling said tubular member and in intimate contact therewith along said entire opening.

* * * * *